(12) United States Patent
Chae et al.

(10) Patent No.: US 10,474,266 B2
(45) Date of Patent: Nov. 12, 2019

(54) DIGITIZER AND FLEXIBLE DISPLAY DEVICE COMPRISING THE SAME

(71) Applicant: DONGWOO FINE-CHEM CO., LTD., Iksan-si, Jeollabuk-do (KR)

(72) Inventors: Seung Jin Chae, Anyang-si (KR); Yoonho Huh, Seoul (KR); Byung Jin Choi, Siheung-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 15/896,601

(22) Filed: Feb. 14, 2018

(65) Prior Publication Data

US 2018/0239478 A1    Aug. 23, 2018

(30) Foreign Application Priority Data

Feb. 17, 2017    (KR) .................. 10-2017-0021327

(51) Int. Cl.
  *G06F 3/046*    (2006.01)
  *G06F 3/041*    (2006.01)
  *G06F 3/044*    (2006.01)

(52) U.S. Cl.
  CPC ............ *G06F 3/0412* (2013.01); *G06F 3/041* (2013.01); *G06F 3/044* (2013.01); *G06F 3/046* (2013.01); *G06F 3/0441* (2019.05); *G06F 3/0442* (2019.05); *G06F 2203/04102* (2013.01); *G06F 2203/04103* (2013.01); *G06F 2203/04114* (2019.05)

(58) Field of Classification Search
  None
  See application file for complete search history.

(56) References Cited

U.S. PATENT DOCUMENTS

2010/0182256 A1*  7/2010  Jeong .................. G06F 3/044
                                                  345/173

FOREIGN PATENT DOCUMENTS

KR    10-2015-0103612 A    9/2015

OTHER PUBLICATIONS

Machine translation of the abstract of KR 1020130044980A into English; Kim et al. (Year: 2013).*

* cited by examiner

*Primary Examiner* — Brian M Butcher
(74) *Attorney, Agent, or Firm* — Sughrue Mion, PLLC

(57) ABSTRACT

A flexible digitizer comprising a flexible substrate and a first and a second electrodes having thicknesses of 2000 Å to 1 μm is provided. The digitizer according to the present invention has sufficient flex resistance for application to a flexible display device with superior electrical characteristics and visibility.

14 Claims, 1 Drawing Sheet

【Figure 1】
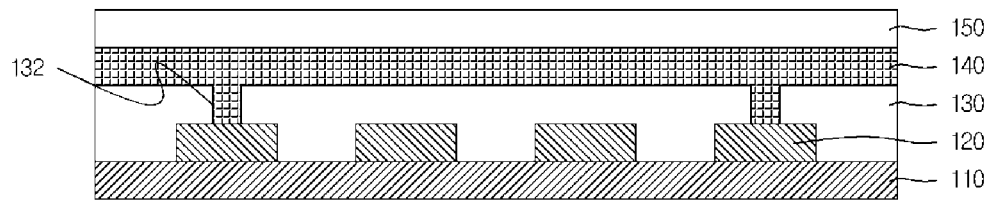
【Figure 2】
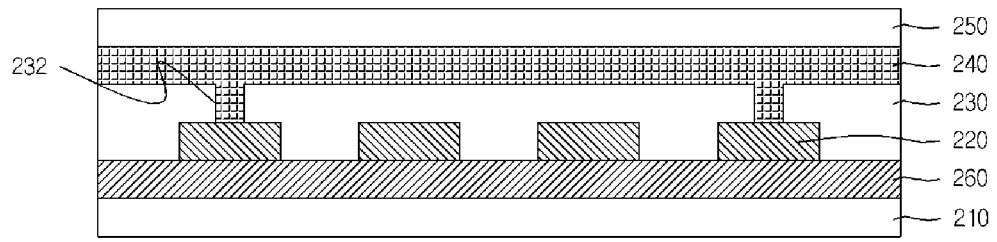
【Figure 3】
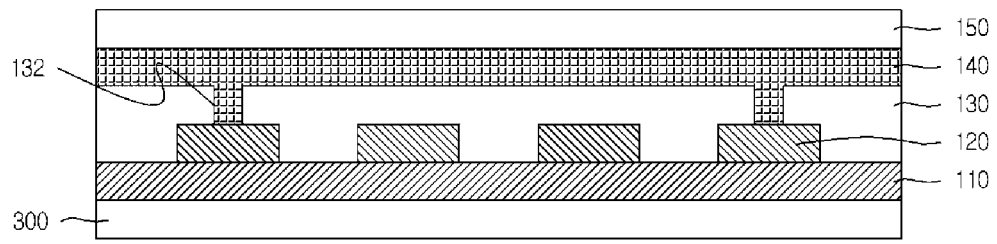
【Figure 4】
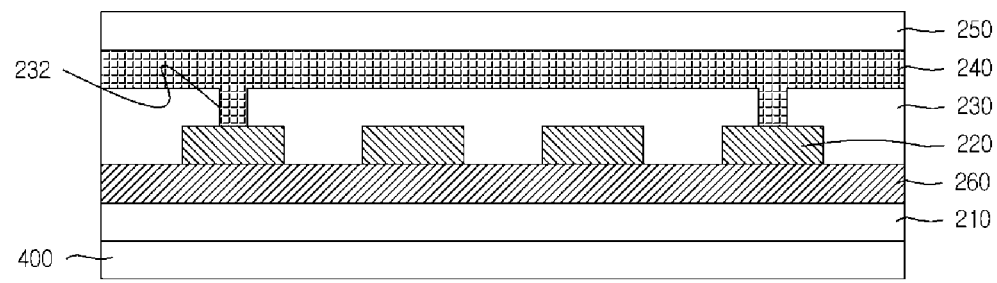

DIGITIZER AND FLEXIBLE DISPLAY DEVICE COMPRISING THE SAME

CROSS REFERENCE TO RELATED APPLICATIONS

This application claims priority based on Korean Patent Application No. 10-2017-0021327, filed Feb. 17, 2017, the content of which is incorporated herein by reference in its entirety.

TECHNICAL FIELD

The present invention relates to a digitizer and a flexible display device comprising the same. Particularly, the present invention relates to a digitizer having sufficient flex resistance for application to a flexible display device and a flexible display device comprising the same.

BACKGROUND ART

In recent display devices, a touch input method in which a user directly touches a screen using a finger or an electronic pen to input is widely used. As such a touch input method can be combined with a display screen without a separate input device such as a keyboard or a mouse, it is advantageously used for a portable terminal such as a smart phone, a notebook computer, and a tablet PC.

In addition, the touch input method can provide an intuitive and convenient user interface by directly touching a specific position of the display screen by a user. Especially, a touch input method using a pen is more accurate than a touch input method using a finger, which is also suitable for performing graphic work such as CAD.

A device used in such a touch input method for converting the coordinates of a pen into digital data is called a digitizer. Depending on the method of detecting coordinates, there are a resistive type, a capacitive type, and an electro-magnetic resonance (EMR) type digitizers.

In an EMR type digitizer, as shown in Korean Patent Laid-Open Publication No. 2015-0103612, a loop coil is disposed on a printed circuit board, and a voltage is applied to the loop coil to control an electromagnetic wave to be generated due to power transmitted so that the generated electromagnetic wave can be absorbed by the EMR pen. Here, the EMR pen may include a capacitor and a loop, and the absorbed electromagnetic wave may be again emitted at a predetermined frequency.

The electromagnetic wave emitted by the EMR pen can be reabsorbed by the loop coil on the printed circuit board again, so that it can be determined which position of the touch screen is close to the EMR pen.

Meanwhile. Korean Patent Laid-Open Publication No. 2015-0103612 discloses that an electrode is formed to have a thickness of 9 to 50 μm, and it is disclosed that when the thickness of the electrode is less than about 9 μm, electrical characteristics may be deteriorated.

DISCLOSURE OF INVENTION

Technical Problem

It is an object of the present invention to provide a digitizer having sufficient flex resistance for application to a flexible display device without deteriorating the electrical characteristics.

Another object of the present invention is to provide a digitizer capable of securing visibility without deteriorating electrical characteristics.

It is still another object of the present invention to provide a flexible display device including the digitizer.

Technical Solution

According to an aspect of the present invention, there is provided a flexible digitizer comprising: a flexible substrate; a first electrode disposed on the flexible substrate and having a thickness of 2000 Å to 1 μm; a first insulation layer disposed on the first electrode and having a through hole exposing the first electrode; and a second electrode disposed on the first insulation layer to be electrically connected to the first electrode via the through hole and having a thickness of 2000 Å to 1 μm.

It is more preferable that the thicknesses of the first and the second electrodes are 3000 to 5000 Å.

The first and the second electrodes may have line widths of 3 to 30 μm, preferably, 3 to 10 μm.

The first and the second electrodes may be formed by sputtering.

The flexible digitizer may further comprise a second insulation layer disposed on the second electrode.

The flexible digitizer may further comprise a protective layer disposed on the flexible substrate, and at this time the first electrode may be disposed on the protective layer.

The total thickness of the digitizer may be less than or equal to 50 μm.

According to another aspect of the present invention, there is provided a flexible display device comprising: the abode-described digitizer and a display layer disposed under the digitizer.

Advantageous Effects

The digitizer according to the present invention has sufficient flex resistance for application to a flexible display device and superior visibility without deteriorating the electrical characteristics.

DESCRIPTION OF DRAWINGS

FIG. 1 is a schematic cross-sectional view of a digitizer according to an embodiment of the present invention.

FIG. 2 is a schematic cross-sectional view of a digitizer according to another embodiment of the present invention.

FIG. 3 is a schematic cross-sectional view of a flexible display device according to an embodiment of the present invention.

FIG. 4 is a schematic cross-sectional view of a flexible display device according to another embodiment of the present invention.

BEST MODE

Hereinafter, the present invention will be described in detail with reference to the accompanying drawings. However, the drawings accompanying the present disclosure are mere examples for describing the present invention, and the present invention is not limited by the drawings. Also, some elements may be exaggerated, scaled-down, or omitted in the drawings for clearer expressions.

An embodiment of the present invention relates to a flexible digitizer comprising: a flexible substrate; a first electrode disposed on the flexible substrate and having a thickness of 2000 Å to 1 μm; a first insulation layer disposed on the first electrode and having a through hole exposing the first electrode; and a second electrode disposed on the first insulation layer to be electrically connected to the first electrode via the through hole and having a thickness of 2000 Å to 1 μm.

The digitizer according to the present invention can ensure sufficient flex resistance for application to a flexible display device without deteriorating the electrical characteristics even though each electrode is thinly formed with a thickness of 2000 Å to 1 μm.

In one embodiment of the present invention, the thicknesses of the first and the second electrodes are 2000 Å to 1 μm. If the thicknesses of the first and second electrodes are less than 2000 Å, the sheet resistance may increase and the electrical characteristics may deteriorate. If the thicknesses of the first and second electrodes exceed 1 μm, the flex resistance may be lowered.

More preferably, the thicknesses of the first and the second electrodes are 3000 to 5000 Å. When the thicknesses of the first and second electrodes are in the range of 3000 to 5000 Å, it is more suitable for a flexible display device because it can ensure flex resistance enough to allow folding as well as bending.

The thicknesses of the first and second electrodes may be the same or different from each other.

In one embodiment of the present invention, the line widths of the first and the second electrodes are 3 to 30 μm. If the line widths of the first and second electrodes are below 3 μm, there may be difficulty in the patterning process. If the line widths of the first and second electrodes are over 30 μm, the visibility becomes poor. Further, in order to secure the reliability of the digitizer operation, a line resistance of 1 kΩ or less is generally required. When this is converted into a sheet resistance, it corresponds to 0.25Ω/□ when the line width is 30 μm.

More preferably, the line widths of the first and the second electrodes are 3 to 10 μm. When the line widths of the first and the second electrodes are 3 to 10 μm, sufficient visibility is secured and it is possible to arrange the digitizer on the display layer such as the OLED layer or the LCD layer, that is, on the front surface of the flexible display device.

In one embodiment of the present invention, the first and second electrodes may include a conductive material, and specifically, the first and second electrodes may be made of a metal material. Examples of the metal material include gold (Au), silver (Ag), copper (Cu), molybdenum (Mo), nickel (Ni), chromium (Cr), silver-palladium-copper alloy (Ag/Pd/Cu, APC), without limitation.

In one embodiment of the present invention, the first and second electrodes may be formed by deposition, particularly by sputtering. By using the sputtering method, the first and second electrodes can be formed to have a smaller thickness than in the case of using a metal foil as in a commercially available digitizer.

In an embodiment of the present invention, the flexible substrate may be a flexible film substrate, especially a transparent film.

The transparent film is not limited if it has good transparency, mechanical strength and thermal stability. Specific examples of the transparent film may include thermoplastic resins, e.g., polyester resins such as polyethylene terephthalate, polyethylene isophthalate, polyethylene naphthalate and polybutylene terephthalate; cellulose resins such as diacetylcellulose and triacetylcellulose; polycarbonate resins; acrylate resins such as polymethyl (meth)acrylate and polyethyl (meth)acrylate; styrene resins such as polystyrene and acrylonitrile-styrene copolymer; polyolefin resins such as polyethylene, polypropylene, polyolefin having a cyclic or norbornene structure, and ethylene-propylene copolymer; vinyl chloride resins; amide resins such as nylon and aromatic polyamide; imide resins; polyethersulfone resins; sulfone resins; polyether ether ketone resins; polyphenylene sulfide resins; vinyl alcohol resins; vinylidene chloride resins; vinyl butyral resins; allylate resins; polyoxymethylene resins; and epoxy resins. Also, a film consisting of a blend of the thermoplastic resins may be used. In addition, thermally curable or UV curable resins such as (meth)acrylate, urethane, acrylic urethane, epoxy and silicon resins may be used.

Such a transparent film may have a suitable thickness. For example, considering workability in terms of strength and handling, and thin layer property, the thickness of the transparent film may range from 1 to 500 μm, preferably 1 to 300 μm, more preferably 5 to 200 μm.

In particular, as it will be described later, a digitizer of the present invention is preferably formed to have a total thickness of equal to or less than 50 μm for application to a flexible display device. Accordingly, the thickness of the flexible substrate may be selected to make the total thickness be equal to or less than 50 μm considering thicknesses of the components of the digitizer such as electrodes and insulation layers.

The transparent film may contain at least one suitable additive. Examples of the additive may include an UV absorber, an antioxidant, a lubricant, a plasticizer, a releasing agent, a coloring-preventing agent, an anti-flame agent, an anti-static agent, a pigment and a colorant. The transparent film may comprise various functional layers including a hard coating layer, an anti-reflective layer and a gas barrier layer, but the present invention is not limited thereto. That is, other functional layers may also be included depending on the desired use.

If necessary, the transparent film may be surface-treated. For example, the surface treatment may be carried out by drying method such as plasma, corona and primer treatment, or by chemical method such as alkali treatment including saponification.

Also, the transparent film may be an isotropic film, a retardation film or a protective film.

In the case of the isotropic film, it is preferred to satisfy an in-plane retardation (Ro) of 40 nm or less, preferably 15 nm or less and a thickness retardation (Rth) of −90 nm to +75 nm, preferably −80 nm to +60 nm, particularly −70 nm to +45 nm, the in-plane retardation (Ro) and thickness retardation (Rth) being represented by the following equations.

$$Ro=[(nx-ny)*d]$$

$$Rth=[(nx+ny)/2-nz]*d$$

wherein, nx and ny are each a main refractive index in a film plane, nz is a refractive index in the thickness direction of film, and d is a thickness of film.

The retardation film may be prepared by uniaxial stretching or biaxial stretching of a polymer film, coating of a polymer or coating of a liquid crystal, and it is generally used for improvement or control of optical properties, e.g., viewing angle compensation, color sensitivity improvement, light leakage prevention, or color control of a display.

The retardation film may include a half-wave (½) or quarter-wave (¼) plate, a positive C-plate, a negative C-plate, a positive A-plate, a negative A-plate, and a biaxial plate.

The protective film may be a polymer resin film comprising a pressure-sensitive adhesive (PSA) layer on at least one surface thereof, or a self-adhesive film such as polypropylene, which may be used for protection of the digitizer surface or improvement of processability.

In one embodiment of the present invention, the digitizer may further comprise a second insulation layer disposed on the second electrode.

Each of the first and the second insulation layers may be formed as an organic insulation layer or an inorganic insulation layer. Through holes may be formed in the first insulation layer to form electrode loops composed of the first and second electrodes.

In one embodiment of the present invention, the digitizer may further comprise a protective layer disposed on the flexible substrate, and at this time the first electrode may be disposed on the protective layer.

The protective layer may be formed of, for example, a polycycloolefin-based material, and may have a thickness of 0.5 to 5 μm.

In one embodiment of the present invention, the total thickness of the digitizer may be less than or equal to 50 μm, for example, 5 to 50 μm.

FIG. 1 is a schematic cross-sectional view of a digitizer according to an embodiment of the present invention.

Referring to FIG. 1, the digitizer according to an embodiment of the present invention comprises a flexible substrate 110, a first electrode 120 disposed on the flexible substrate 110, a first insulation layer 130 formed on the first electrode 120 and having a through hole 132 exposing the first electrode 120, a second electrode 140 formed on the first insulation layer 130 to be electrically connected to the first electrode 120 via the through hole 132, and a second insulation layer 150 formed on the second electrode 140.

FIG. 2 is a schematic cross-sectional view of a digitizer according to another embodiment of the present invention.

Referring to FIG. 2, the digitizer according to another embodiment of the present invention comprises a flexible substrate 210, a protective layer 260 formed on the flexible substrate 210, a first electrode 220 formed on the protective layer 260, a first insulation layer 230 formed on the first electrode 220 and having a through hole 232 exposing the first electrode 220, a second electrode 240 formed on the first insulation layer 230 to be electrically connected to the first electrode 220 via the through hole 232, and a second insulation layer 250 formed on the second electrode 240.

An embodiment of the present invention relates to a flexible display device including the digitizer.

FIG. 3 is a schematic cross-sectional view of a flexible display device according to an embodiment of the present invention.

Referring to FIG. 3, the flexible display device according to an embodiment of the present invention comprises a flexible substrate 110, a first electrode 120 disposed on the flexible substrate 110, a first insulation layer 130 formed on the first electrode 120 and having a through hole 132 exposing the first electrode 120, a second electrode 140 formed on the first insulation layer 130 to be electrically connected to the first electrode 120 via the through hole 132, a second insulation layer 150 formed on the second electrode 140, and a display layer 300 disposed under the flexible substrate 110.

FIG. 4 is a schematic cross-sectional view of a flexible display device according to another embodiment of the present invention.

Referring to FIG. 4, the flexible display device according to another embodiment of the present invention comprises a flexible substrate 210, a protective layer 260 formed on the flexible substrate 210, a first electrode 220 formed on the protective layer 260, a first insulation layer 230 formed on the first electrode 220 and having a through hole 232 exposing the first electrode 220, a second electrode 240 formed on the first insulation layer 230 to be electrically connected to the first electrode 220 via the through hole 232, a second insulation layer 250 formed on the second electrode 240, and a display layer 400 disposed under the flexible substrate 210.

Here, the display layers 300 and 400 may be an LCD layer or an OLED layer, and any other display layer used in a conventional flexible display device may be utilized.

Hereinafter, the present invention will be described in more detail with reference to examples, comparative examples and experimental examples. It should be apparent to those skilled in the art that these examples, comparative examples, and experimental examples are only for illustrating the present invention, and the scope of the present invention is not limited thereto.

Examples 1 to 10 and Comparative Examples 1 to 6

Digitizers having electrodes of various thicknesses and line widths were fabricated, and their characteristics were examined. The results are shown in Tables 1 and 2.

In Examples 1 to 5 and Comparative Examples 1 to 3 shown in Table 1, a substrate having a thickness of 13 μm was used as a flexible substrate. Examples 6 to 10 and Comparative Examples 4 to 6 shown in Table 2 were prepared with a substrate having a thickness of 40 μm as a flexible substrate.

Specifically, COP (Cyclo Olefin Polymer) films having the above thicknesses were used as flexible substrates, and APC was used as an electrode material.

The method used for forming the digitizer of the examples and the comparative examples is now described.

First, a composition for forming a protective layer was coated on a substrate and heat-treated at 230° C. for 20 minutes. Then, APC for the first electrode was deposited according to the thicknesses corresponding to the respective Examples and Comparative Examples.

Next, the first electrode was patterned by development and wet etching, and a first organic insulation film (DW-LT09) with through holes was formed on the first electrode.

Next, APC for the second electrode was deposited on the first insulation film according to the thicknesses corresponding to the respective examples and the comparative examples, and the second electrode was formed by development and wet etching.

Finally, a second organic insulation film (DW-LT09) was formed on the second electrode.

TABLE 1

|  | electrode thickness | electrode line width (μm) | sheet resistance (Ω/□) | visibility (○: excellent Δ: normal X: poor) | flex resistance |
| --- | --- | --- | --- | --- | --- |
| Example 1 | 2000 Å | 30 | 0.2 | Δ | 200,000 times OK |
| Example 2 | 3000 Å | 15 | 0.1 | Δ | 200,000 times OK |
| Example 3 | 4000 Å | 9 | 0.06 | ○ | 200,000 times OK |

TABLE 1-continued

| | electrode thickness | electrode line width (μm) | sheet resistance (Ω/□) | visibility (○: excellent Δ: normal X: poor) | flex resistance |
|---|---|---|---|---|---|
| Example 4 | 5000 Å | 5 | 0.04 | ○ | 200,000 times OK |
| Example 5 | 1 μm | 3 | 0.02 | ○ | 50,000 times cracking |
| Comparative Example 1 | 1000 Å | 90 | 0.6 | X | 200,000 times OK |
| Comparative Example 2 | 2 μm | 3 | 0.017 | ○ | 10,000 times cracking |
| Comparative Example 3 | 3 μm | 3 | 0.015 | ○ | 10,000 times cracking |

TABLE 2

| | electrode thickness | electrode line width (μm) | sheet resistance (Ω/□) | visibility (○: excellent Δ: normal X: poor) | flex resistance |
|---|---|---|---|---|---|
| Example 6 | 2000 Å | 30 | 0.2 | Δ | 200,000 times OK |
| Example 7 | 3000 Å | 15 | 0.1 | Δ | 200,000 times OK |
| Example 8 | 4000 Å | 9 | 0.06 | ○ | 200,000 times OK |
| Example 9 | 5000 Å | 5 | 0.04 | ○ | 200,000 times OK |
| Example 10 | 1 μm | 3 | 0.02 | ○ | 5,000 times cracking |
| Comparative Example 4 | 1000 Å | 90 | 0.6 | X | 200,000 times OK |
| Comparative Example 5 | 2 μm | 3 | 0.017 | ○ | 2,000 times cracking |
| Comparative Example 6 | 3 μm | 3 | 0.015 | ○ | 2,000 times cracking |

In order to secure the reliability of the digitizer operation, a line resistance of 1 kΩ or less is generally required. When this is converted into a sheet resistance, it corresponds to 0.2Ω/□ when the line width is 30 μm. In all of Examples 1 to 10, it can be confirmed that the sheet resistance is 0.2Ω/□ or less.

In the case of Comparative Examples 1 and 4, if the electrode is formed to have a line width of 90 μm with the thickness of 1000 Å, it corresponds to a sheet resistance of 0.6Ω/□ or less, but in this case, visibility is deteriorated due to an increase in line width.

With regard to a result of visibility examination with the naked eye, Examples 1 to 10 having a line width of 3 to 30 μm exhibited normal or excellent visibility, and Examples 3 to 5 and Examples 8 to 10 with the line width less than 10 μm showed excellent visibility.

Folding evaluation was performed at room temperature in such a manner that the center of the digitizer manufactured according to the above Examples and Comparative Examples were folded and unfolded repeatedly. In this manner, the inside circle was set to 2R (radius 2 mm), folding evaluation was performed up to 200,000 times, and it was judged OK when there was no cracking.

In case where the electrode thickness was equal to or less than 5000 Å, there were no cracking occurred in Examples 1 to 4, which used substrates of 13 μm thickness as flexible substrates, and in Examples 6 to 9, which used substrates of 40 μm thickness as flexible substrates.

In Example 5 using a substrate having a thickness of 13 μm as a flexible substrate and having an electrode thickness of 1 μm, cracking occurred at 50,000 times folding, and in Example 10 using a substrate having a thickness of 40 μm as a flexible substrate and having an electrode thickness of 1 μm, cracking occurred at 5,000 times folding.

In Comparative Examples 2 and 3 (substrate thickness 13 μm) and Comparative Examples 5 and 6 (substrate thickness 40 μm) with electrode thicknesses of 2 μm or more, cracking occurred at 10,000 times and 2,000 times folding, respectively.

As shown in Tables 1 and 2, the digitizers according to Examples 1 to 5 and 6 to 10 were found to have excellent electrical characteristics (sheet resistance), visibility and flex resistance. On the other hand, Comparative Examples 1 and 4 did not satisfy the visibility, whereas Comparative Examples 2, 3, 5 and 6 did not satisfy the flex resistance.

Although particular embodiments and examples of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

| [Description of reference numerals] | |
|---|---|
| 110, 210: flexible substrate | 120, 220: first electrode |
| 130, 230: first insulation layer | 132, 232: through hole |
| 140, 240: second electrode | 150, 250: second insulation layer |
| 260: protective layer | 300, 400: display layer |

The invention claimed is:

1. A flexible digitizer comprising:
   a flexible substrate;
   a first electrode disposed on the flexible substrate and having a thickness of 2000 Å to 1 μm;
   a first insulation layer disposed on the first electrode and having a through hole exposing the first electrode; and
   a second electrode disposed on the first insulation layer to be electrically connected to the first electrode via the through hole and having a thickness of 2000 Å to 1 μm,
   wherein the first and the second electrodes each have a line width of 3 to 30 μm and a line resistance of 1 kΩ or less, and
   wherein the flexible digitizer is an electro-magnetic resonance (EMR) type digitizer.

2. The flexible digitizer of claim 1, wherein the thicknesses of the first and the second electrodes are 3000 to 5000 Å.

3. The flexible digitizer of claim 1, wherein the first and the second electrodes have line widths of 3 to 10 μm.

4. The flexible digitizer of claim 1, wherein the first and the second electrodes are formed by sputtering.

5. The flexible digitizer of claim 1, further comprising a second insulation layer disposed on the second electrode.

6. The flexible digitizer of claim 1, further comprising a protective layer disposed on the flexible substrate, wherein the first electrode is disposed on the protective layer.

7. The flexible digitizer of claim 1, wherein the total thickness of the digitizer is less than or equal to 50 μm.

8. A flexible display device comprising:
a digitizer according to claim 1; and
a display layer disposed under the digitizer.

9. A flexible display device comprising:
a digitizer according to claim 2; and
a display layer disposed under the digitizer.

10. A flexible display device comprising:
a digitizer according to claim 3; and
a display layer disposed under the digitizer.

11. A flexible display device comprising:
a digitizer according to claim 4; and
a display layer disposed under the digitizer.

12. A flexible display device comprising:
a digitizer according to claim 5; and
a display layer disposed under the digitizer.

13. A flexible display device comprising:
a digitizer according to claim 6; and
a display layer disposed under the digitizer.

14. A flexible display device comprising:
a digitizer according to claim 7; and
a display layer disposed under the digitizer.

* * * * *